US006408101B1

(12) United States Patent
Krishnamurthy et al.

(10) Patent No.: US 6,408,101 B1
(45) Date of Patent: *Jun. 18, 2002

(54) APPARATUS AND METHOD FOR EMPLOYING M-ARY PYRAMIDS TO ENHANCE FEATURE-BASED CLASSIFICATION AND MOTION ESTIMATION

(75) Inventors: Ravi Krishnamurthy; Tihao Chiang; Ya-Qin Zhang, all of Plainsboro; Zudong Song, Lawrenceville, all of NJ (US)

(73) Assignee: Sarnoff Corporation, Princeton, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/002,258
(22) Filed: Dec. 31, 1997
(51) Int. Cl.⁷ .................................. G06K 9/46
(52) U.S. Cl. ........................... 382/240; 382/239
(58) Field of Search ..................... 382/239, 240, 382/232, 236, 251, 253; 341/79; 348/404.1, 407.1, 408.1, 419.1; 375/240.02, 240.13, 240.16, 240.18, 240.2, 240.21, 240.24, 240.25

(56) References Cited

U.S. PATENT DOCUMENTS 5,799,111 A * 8/1998 Guissin ..................... 382/254
6,236,758 B1 * 5/2001 Sodagar et al. ............. 382/240

OTHER PUBLICATIONS

"A Fast Hierarchical Motion Vector Estimation Algorithm Using Mean Pyramid", Nam et al., IEEE Transactions on Circuits and Systems for Video Technology, vol. 5, No. 4, Aug. 1995, pp. 344–351.

"A Fast Hierarchical Motion–Compensation Scheme for Video Coding Using Block Feature Matching", X. Lee and Y–Q. Zhang, IEEE Trans. on Circuits and Systems for Video Technology, vol. 6, No. 6, Dec. 1996, pp. 627–635.

"Block Motion Vector Estimation Using Edge Matching: An Approach with Better Frame Quality as Compared to Full Search Algorithm" Y–L. Chan, W–C. Siu, 1997 IEEE Int. Symp. on Circuits and Syst., Jun. 9–12, 1997, Hong Kong.

"Low–Complexity Block–Based Motion Estimation via One–Bit Transforms", Natarajan et al., IEEE Transactions on Circuits and Systems for Video Technology, vol. 7, No. 4, Aug. 1997, pp. 702–706.

* cited by examiner

Primary Examiner—Joseph Mancuso
Assistant Examiner—Vikkram Bali
(74) Attorney, Agent, or Firm—William J. Burke

(57) ABSTRACT

An apparatus and a concomitant method for using M-ary pyramid decomposition to reduce the computational complexity in determining motion vectors for block-based motion estimation is disclosed.

25 Claims, 5 Drawing Sheets

APPARATUS AND METHOD FOR EMPLOYING M-ARY PYRAMIDS TO ENHANCE FEATURE-BASED CLASSIFICATION AND MOTION ESTIMATION

The invention relates generally to a system for encoding image sequences and, more particularly, to apparatus and a concomitant method for reducing the computational complexity in determining motion vectors for block-based motion estimation and for enhancing the accuracy of motion estimates.

BACKGROUND OF THE INVENTION

An image sequence, such as a video image sequence, typically includes a sequence of image frames or pictures. The reproduction of video containing moving objects typically requires a frame speed of thirty image frames per second, with each frame possibly containing in excess of a megabyte of information. Consequently, transmitting or storing such image sequences requires a large amount of either transmission bandwidth or storage capacity. To reduce the necessary transmission bandwidth or storage capacity, the frame sequence is compressed such that redundant information within the sequence is not stored or transmitted. Television, video conferencing and CD-ROM archiving are examples of applications which can benefit from efficient video sequence encoding.

Generally, to encode an image sequence, information concerning the motion of objects in a scene from one frame to the next plays an important role in the encoding process. Because of the high redundancy that exists between consecutive frames within most image sequences, substantial data compression can be achieved using a technique known as motion estimation/compensation. In brief, the encoder only encodes the differences relative to areas that are shifted with respect to the areas coded. Namely, motion estimation is a process of determining the direction and magnitude of motion (motion vectors) for an area (e.g., a block or macroblock) in the current frame relative to one or more reference frames. Whereas, motion compensation is a process of using the motion vectors to generate a prediction (predicted image) of the current frame. The difference between the current frame and the predicted frame results in a residual signal (error signal), which contains substantially less information than the current frame itself. Thus, a significant saving in coding bits is realized by encoding and transmitting only the residual signal and the corresponding motion vectors.

To illustrate, in a sequence containing motion, a current frame can be reconstructed using an immediately preceding frame and the residual signal representing the difference between the current and the immediately preceding frame. The transmitter or encoder transmits the preceding frame, the residual signal and the corresponding motion vectors to a receiver. At the receiver, the current frame is reconstructed by combining the preceding frame with the residual signal and the motion information. Consequently, only one (1) frame and the difference information with its associated motion vectors are transmitted and received rather than two (2) entire frames.

However, encoder designers must address the dichotomy of attempting to increase the precision of the motion estimation process to minimize the residual signal (i.e., reducing coding bits) or accepting a lower level of precision in the motion estimation process to minimize the computational overhead. Namely, determining the motion vectors from the frame sequence requires intensive searching between frames to determine the motion information. A more intensive search will generate a more precise set of motion vectors at the expense of more computational cycles.

For examples, many systems determine motion information using a so-called block based approach. In a simple block based approach, the current frame is divided into a number of blocks of pixels (referred to hereinafter as the current blocks). For each of these current blocks, a search is performed within a selected search area in the preceding frame for a block of pixels that "best" matches the current block. This search is typically accomplished by repetitively comparing a selected current block to similarly sized blocks of pixels in the selected search area of the preceding frame. Once a block match is found, the location of matching block in the search area in the previous frame relative to the location of the current block within the current frame defines a motion vector. This approach, i.e., comparing each current block to an entire selected search area, is known as a full search approach or the exhaustive search approach. The determination of motion vectors by the exhaustive search approach is computationally intensive, especially where the search area is particularly large. A such, these systems tend to be relatively slow in processing the frames and expensive to fabricate.

Therefore, there is a need in the art for an apparatus and a concomitant method for reducing the computational complexity in determining motion vectors for block-based motion estimation.

SUMMARY OF THE INVENTION

The present invention is an apparatus and method for reducing the computational complexity in determining motion vectors for block-based motion estimation and for enhancing the accuracy of motion estimation methods. More specifically, the present invention decomposes each of the image frames within an image sequence into a M-ary pyramid. The blocks within the image frame are then classified into blocks of high activity versus blocks of low activity. This classification rapidly provides useful "feature" information to the motion estimation method which then applies this feature information to further enhance the motion estimation process.

BRIEF DESCRIPTION OF THE DRAWINGS

The teachings of the present invention can be readily understood by considering the following detailed description in conjunction with the accompanying drawings, in which.

DETAILED DESCRIPTION

Figure 1:
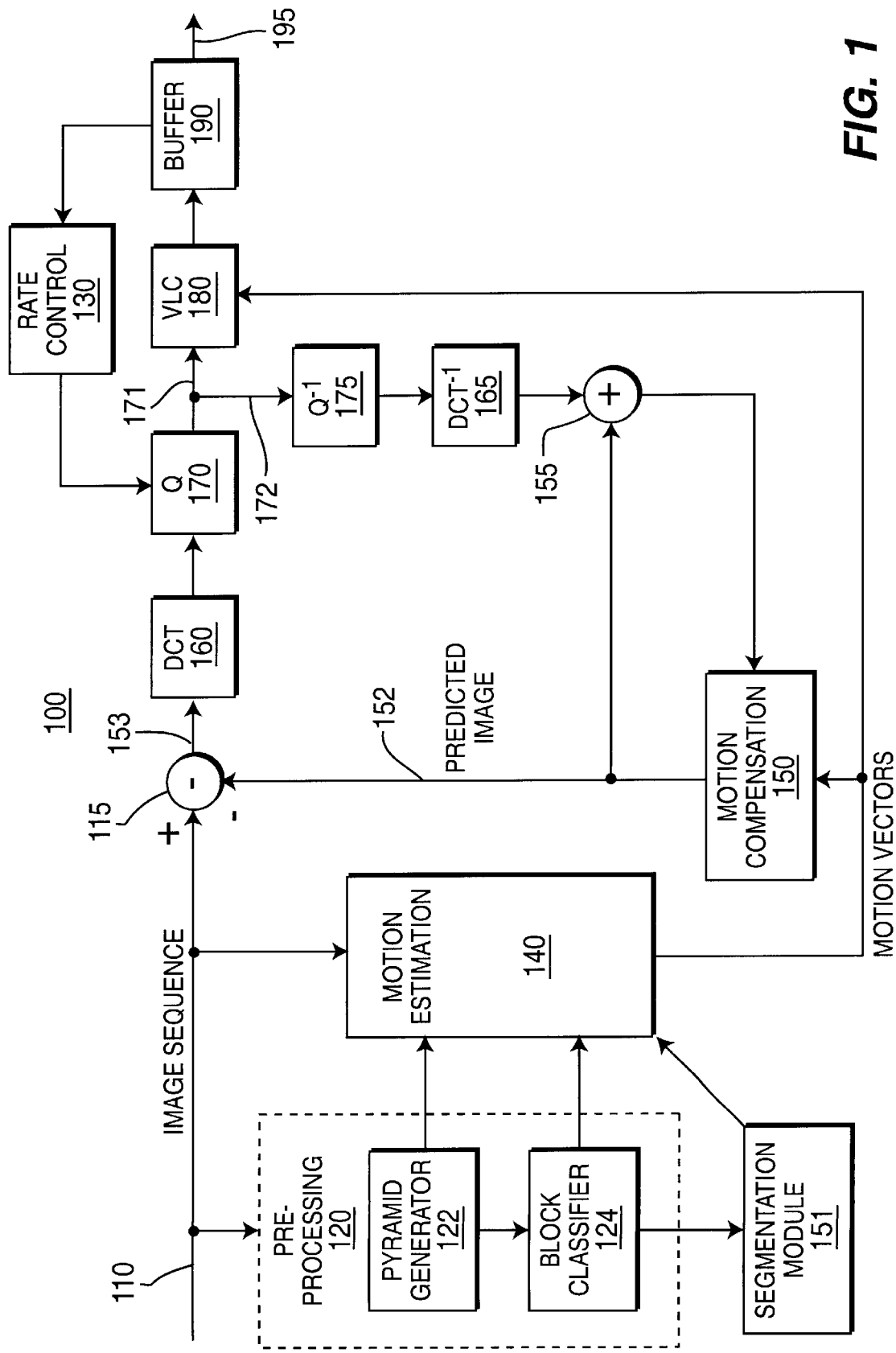
FIG. 1 illustrates a block diagram of the encoder of the present invention for reducing the computational complexity in determining motion vectors for block-based motion estimation.

FIG. 1 depicts a block diagram of the apparatus 100 of the present invention for reducing the computational complexity in determining motion vectors for block-based motion estimation. The preferred embodiment of the present invention is described below using an encoder, but it should be understood that the present invention can be employed in image processing systems in general. Furthermore, the present invention can be employed in encoders that are in compliant with various coding standards. These standards include, but are not limited to, the Moving Picture Experts Group Standards (e.g., MPEG-1 (11172-*) and MPEG-2 (13818-*), H.261 and H.263.

The apparatus 100 is an encoder or a portion of a more complex block-based motion compensated coding system. The apparatus 100 comprises a motion estimation module 140, a motion compensation module 150, an optional segmentation module 151, a preprocessing module 120, a rate control module 130, a transform module, (e.g., a DCT module) 160, a quantization module 170, a coder, (e.g., a variable length coding module) 180, a buffer 190, an inverse quantization module 175, an inverse transform module (e.g., an inverse DCT module) 165, a subtractor 115 and a summer 155. Although the encoder 100 comprises a plurality of modules, those skilled in the art will realize that the functions performed by the various modules are not required to be isolated into separate modules as shown in FIG. 1. For example, the set of modules comprising the motion compensation module 150, inverse quantization module 175 and inverse DCT module 165 is generally known as an "embedded decoder".

FIG. 1 illustrates an input image (image sequence) on path 110 which is digitized and represented as a luminance and two color difference signals (Y, $C_r$, $C_b$) in accordance with the MPEG standards. These signals are further divided into a plurality of layers such that each picture (frame) is represented by a plurality of macroblocks. Each macroblock comprises four (4) luminance blocks, one $C_r$ block and one $C_b$ block where a block is defined as an eight (8) by eight (8) sample array. The division of a picture into block units improves the ability to discern changes between two successive pictures and improves image compression through the elimination of low amplitude transformed coefficients (discussed below).

In the preferred embodiment, the digitized input image signal undergoes one or more preprocessing steps in the preprocessing module 120. More specifically, preprocessing module 120 comprises a pyramid generator 122 and a block classifier 124. The pyramid generator 122 decomposes or filters each frame into a plurality of different resolutions, i.e., a pyramid of resolutions, where the different resolutions of each frame are correlated in a hierarchical fashion as described below. In turn, using the pyramid of resolutions, the block classifier 124 is able to quickly classify areas (blocks) as areas of high activity or low activity. A detailed description is provided below for the functions performed by the preprocessing module 120.

The input image on path 110 is also received into motion estimation module 140 for estimating motion vectors. A motion vector is a two-dimensional vector which is used by motion compensation to provide an offset from the coordinate position of a block in the current picture to the coordinates in a reference frame. The use of motion vectors greatly enhances image compression by reducing the amount of information that is transmitted on a channel because only the changes within the current frame are coded and transmitted. In the preferred embodiment, the motion estimation module 140 also receives information from the preprocessing module 120 to enhance the performance of the motion estimation process.

The motion vectors from the motion estimation module 140 are received by the motion compensation module 150 for improving the efficiency of the prediction of sample values. Motion compensation involves a prediction that uses motion vectors to provide offsets into the past and/or future reference frames containing previously decoded sample values, and is used to form the prediction error. Namely, the motion compensation module 150 uses the previously decoded frame and the motion vectors to construct an estimate (motion compensated prediction or predicted image) of the current frame on path 152. This motion compensated prediction is subtracted via subtractor 115 from the input image on path 110 in the current macroblocks to form an error signal (e) or predictive residual on path 153.

The predictive residual signal is passed to a transform module, e.g., a DCT module 160. The DCT module then applies a forward discrete cosine transform process to each block of the predictive residual signal to produce a set of eight (8) by eight (8) block of DCT coefficients. The discrete cosine transform is an invertible, discrete orthogonal transformation where the DCT coefficients represent the amplitudes of a set of cosine basis functions.

The resulting 8×8 block of DCT coefficients is received by quantization (Q) module 170, where the DCT coefficients are quantized. The process of quantization reduces the accuracy with which the DCT coefficients are represented by dividing the DCT coefficients by a set of quantization values or scales with appropriate rounding to form integer values. The quantization values can be set individually for each DCT coefficient, using criteria based on the visibility of the basis functions (known as visually weighted quantization). By quantizing the DCT coefficients with this value, many of the DCT coefficients are converted to zeros, thereby improving image compression efficiency.

Next, the resulting 8×8 block of quantized DCT coefficients is received by a coder, e.g., variable length coding module 180 via signal connection 171, where the two-dimensional block of quantized coefficients is scanned in a "zig-zag" order to convert it into a one-dimensional string of quantized DCT coefficients. Variable length coding (VLC) module 180 then encodes the string of quantized DCT coefficients and all side-information for the macroblock such as macroblock type and motion vectors. Thus, the VLC module 180 performs the final step of converting the input image into a valid data stream.

The data stream is received into a buffer, e.g., a "First In-First Out" (FIFO) buffer 190. A consequence of using different picture types and variable length coding is that the overall bit rate is variable. Namely, the number of bits used to code each frame can be different. Thus, in applications that involve a fixed-rate channel, a FIFO buffer is used to match the encoder output to the channel for smoothing the bit rate. Thus, the output signal on path 195 from FIFO buffer 190 is a compressed representation of the input image 110, where it is sent to a storage medium or a telecommunication channel.

The rate control module 130 serves to monitor and adjust the bit rate of the data stream entering the FIFO buffer 190 to prevent overflow and underflow on the decoder side (within a receiver or target storage device, not shown) after transmission of the data stream. A fixed-rate channel is assumed to carry bits at a constant rate to an input buffer within the decoder (not shown). At regular intervals determined by the picture rate, the decoder instantaneously removes all the bits for the next picture from its input buffer. If there are too few bits in the input buffer, i.e., all the bits for the next picture have not been received, then the input buffer underflows resulting in an error. Similarly, if there are too many bits in the input buffer, i.e., the capacity of the input buffer is exceeded between picture starts, then the input buffer overflows resulting in an overflow error. Thus, it is the task of the rate control module 130 to monitor the status of buffer 190 to control the number of bits generated by the encoder, thereby preventing the overflow and underflow conditions. A rate control method may control the number of coding bits by adjusting the quantization scales.

Furthermore, the resulting 8×8 block of quantized DCT coefficients from the quantization module 170 is received by the inverse quantization module 175 and inverse DCT module 165 via signal connection 172. In brief, at this stage, the encoder regenerates I-frames and P-frames of the image sequence by decoding the data so that they are used as reference frames for subsequent encoding.

Figure 2:
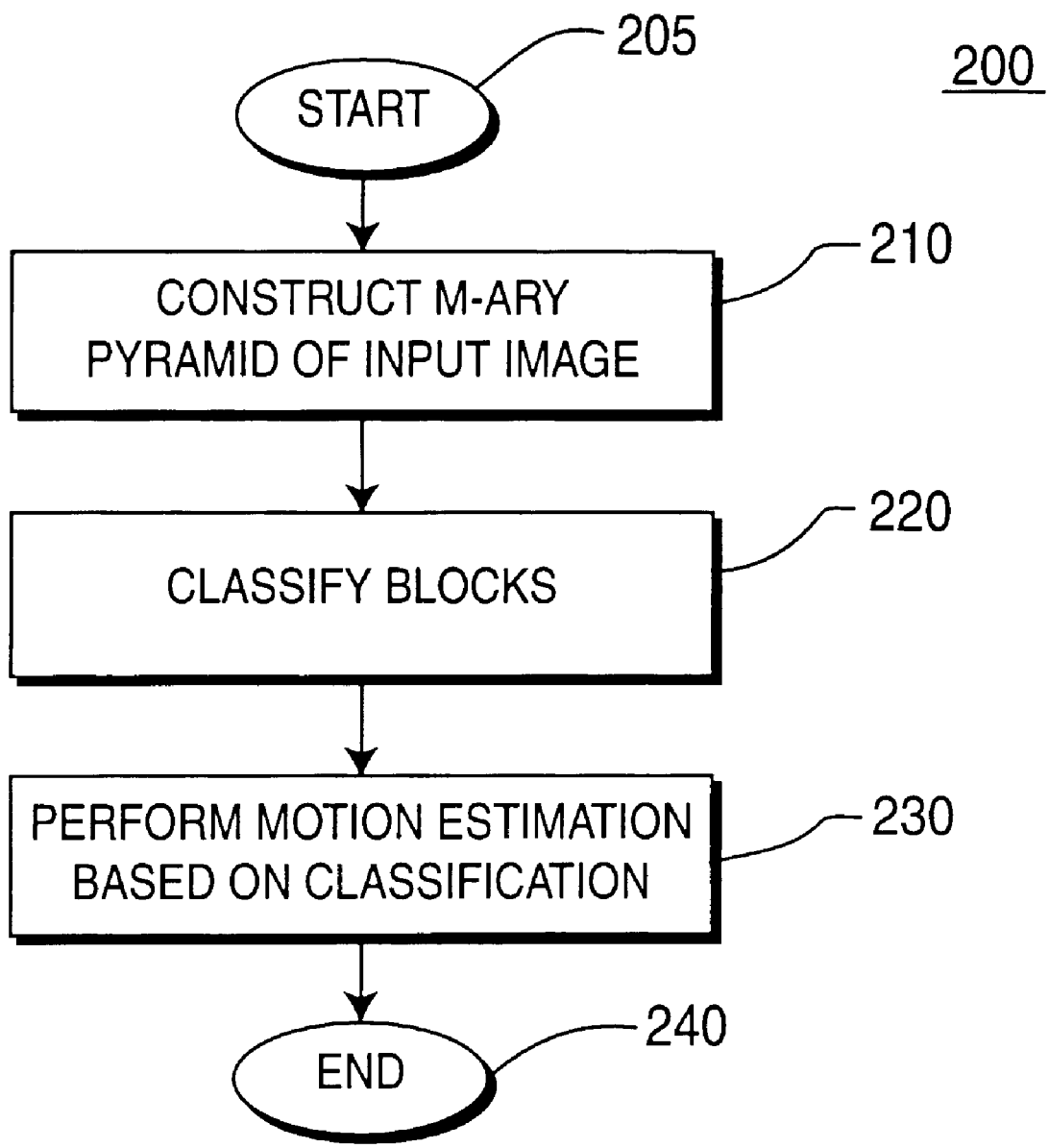
FIG. 2 illustrates a flowchart of a method for reducing the computational complexity in determining motion vectors for block-based motion estimation.

FIG. 2 illustrates a flowchart of a method 200 for reducing the computational complexity in determining motion vectors for block-based motion estimation. Namely, the method 200 enhances a block-based motion estimation method by quickly defining an initial search area where a match will likely occur.

Figure 3:
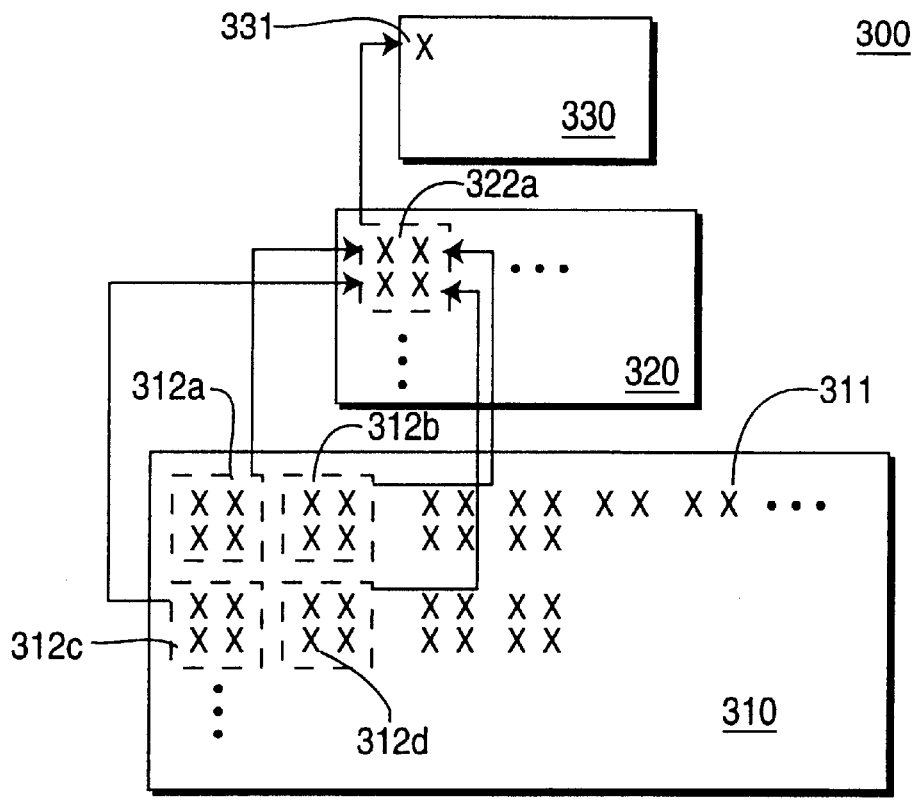
FIG. 3 illustrates a block diagram of a general mean pyramid.

More specifically, method starts in step 205 and proceeds to step 210 where a M-ary pyramid (or M-ary mean pyramid) is generated for each image frame in the image sequence. FIG. 3 illustrates a block diagram of a general mean pyramid 300, where the mean pyramid comprises a plurality of levels 310, 320 and 330. The lowest level 310 is an original image frame from the image sequence having a plurality of pixels 311 represented by "x"s. Typically, these pixels are represented by pixel values having a range that is limited by the number of bits allocated to represent the pixel values. For example, if eight (8) bits are allocated, then a pixel value may take a value from one of 256 possible values.

In a mean pyramid, a next higher level is generated by lowpass filtering and down sampling by a factor of two in both directions, thereby generating a single pixel value (parent) for a higher level from four (4) pixel values (children) in a lower level. This is illustrated in FIG. 3, where each set of four pixels 312a–d is used to generate a single pixel value 321 in level 320. In turn, the set of four pixel values 322a is used to generate a single pixel value 331 in level 330 and so on. It should be understood that the present invention is not limited to a mean pyramid having three levels. The number of levels is generally limited by the size of the image and the downsampling factor selected to generate the next lower resolution image. Thus, the number of levels in the mean pyramid can be selected for a particular application.

In a mean pyramid, the parent pixel value is derived by taking the average of its four children pixel values, thus the term mean pyramid. However, other measure or metric can be used to generate other types of pyramids, e.g., the measure can be based on the median of the four children pixel values. Alternatively, a larger area around the children pixels can be used for a weighted average to obtain a general lowpass pyramid.

In a M-ary pyramid, the pixel values are quantized such that each quantized pixel value can only take "M" possible pixel values. For example, if M equals to two (2), then each quantized pixel value, can take on a value of 0 or 1, i.e., resulting in a "binary pyramid".

Figure 4:
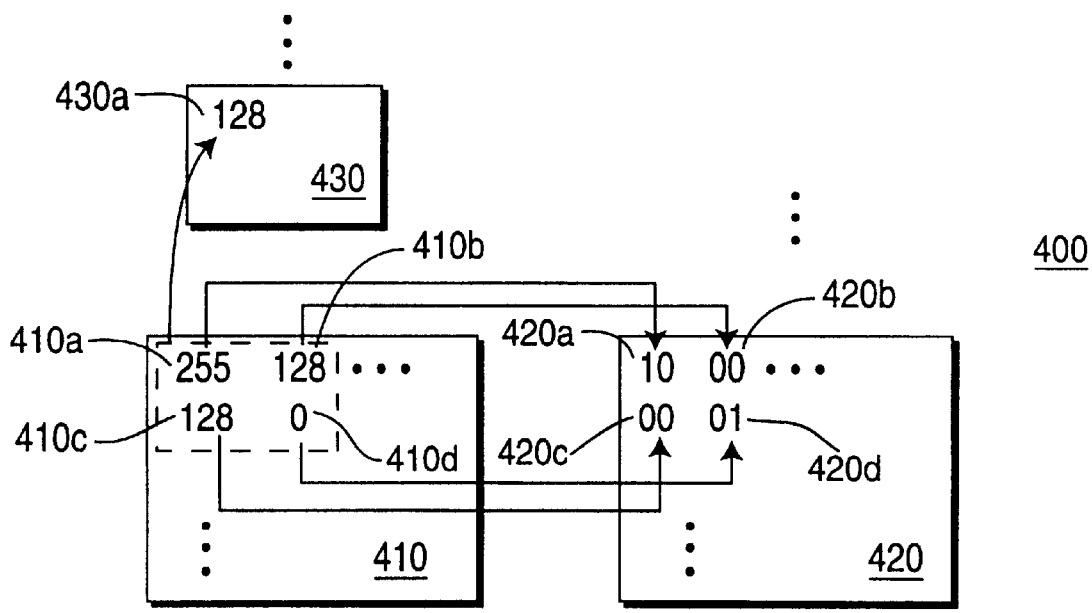
FIG. 4 illustrates a block diagram of the quantization process that generates a M-ary pyramid.

FIG. 4 illustrates a block diagram of the quantization process that generates a ternary pyramid, where M equals to three (3). More specifically, an eight-bit pixel value 255 (410a) is quantized into a two-bit pixel value 10 (420a) based on the difference between the child and parent pixels. Namely, a difference is computed between a parent 430a and each of its children 410a–d, where each of the four (4) differences is then quantized into three possible values 10, 00, and 01. Thus, pixel value 128 (410b and 410c) is quantized into a pixel value 00 (420b and 420c) and pixel value 0 (410d) is quantized into a pixel value 01 (420d). These representation levels are suitable for the bit wise XOR based cost function that will be used for motion estimation. They are also useful for feature detection and block classification. The M-ary pyramid reduces accuracy of the pixel values, thereby allowing rapid detection of "features" within an image. Features are defined as areas of high activities or intensity, e.g., the edges of an object. It should be noted that the levels 410 and 430 are levels of a mean pyramid, while level 420 is a level of a M-ary pyramid (where M=3). Both of these pyramids may have additional levels as illustrated in FIG. 4, but the M-ary pyramid will always have one level less than the mean pyramid. Namely, one needs two mean pyramid levels 410 and 430 to generate a single M-ary pyramid level 420.

Furthermore, the significant reduction in the number of bits used to represent the pixel values translates into a reduction in computational overhead in the motion estimation process. For example, the block matching operation performed in the motion estimation process can be accelerated since there are fewer possible values that a pixel value can take on, thereby simplifying the overall block matching process.

Although M can be any value, it has been found that a binary pyramid decomposition is sensitive to noise. Namely, since the quantized pixel values can only take one of two possible values, noise can introduce errors, where a pixel value can be erroneously interpreted as having a value 1 instead of 0 or vice versa. Such over sensitivity causes erroneous interpretation of the presence or absence of a feature. Thus, it has been found that a M-ary pyramid decomposition is best employed when M is greater than 2.

It should be understood that the important aspect in step 210 is the generation of a M-ary pyramid for each of the input images in the image sequence. As such, although the preferred embodiment generates a M-ary mean pyramid, other types of M-ary pyramids can be employed in the present invention, e.g., a M-ary median pyramid, M-ary Lowpass pyramid and so on.

Alternately, the inventive concept of a M-ary mean pyramid decomposition can be expressed in equation form. Let (i, j) represent the pixel locations on an image frame and let I(i, j) represent the intensity at location (i, j). Further, let l indicate the level within a pyramid, with $0 \leq l \leq L$, where L is the highest level in the pyramid. Then, the mean pyramids $X^l(i, j), 1 \leq l \leq L$ are constructed as follows:

$$X^l(i, j) = \frac{1}{4} \sum_{m=0}^{1} \sum_{n=0}^{1} X^{l-1}(2i+m, 2j+n) \qquad (1)$$

where $X^0(i, j) = I(i, j)$.

From these mean pyramids, features within a block can extracted in step 220 below. In the preferred embodiment, the block is a 8×8 subblock of a macroblock, but it should be understood that the present invention is not limited to this block size. In particular, features like edges can be extracted from the variation of intensities within a block. This variation is represented by calculating the difference between the mean value at a level l, 0≤l≤L−1 and the mean value at level l+1. However, in order to obtain a robust feature, and in order to facilitate fast motion estimation, this difference is quantized using M levels and represent the quantized values using $\log_2 M$ bits. This will create a pattern over the image that is used to identify image features like edges and zero-crossings. Denoting this pattern value by $Y^l(i, j)$:

$$Y^l(i, j) = Quant\left[X^l(i, j) - X^{l+1}\left(INT\left(\frac{i}{2}\right), INT\left(\frac{j}{2}\right)\right)\right], \quad (2)$$
$$0 \le l \le L - 1$$

Denote the argument of Quant[·] by λ. For example, consider the case of ternary pyramids having a threshold T, and define $Y^l(i, j)$ as follows:

$$Y^l(i, j) = \begin{cases} 00 & |\lambda| < T \\ 01 & \lambda > T \\ 10 & \lambda < -T \end{cases} \quad (3)$$

This definition has the advantage of noise-robustness if the quantization threshold T (e.g., in the preferred embodiment T is selected to 5) is suitably chosen for a particular application. Namely, it is possible to define a "dead zone", e.g., |λ|<T, where slight variations in the pixel values due to noise can be removed effectively. Thus, any M-ary pyramids (M>2) having a dead zone around zero will minimize the noise sensitivity problem as seen in the binary pyramid.

In relatively flat areas (areas of low activities), $Y^l(i, j)$ will contain a large number of zeros (0), while in regions containing edges, $Y^l(i, j)$ will contain a number of ones (1). Once the input image is decomposed into a M-ary pyramid, the blocks in the input image can be classified for the purpose of feature extraction using the M-ary pyramid, $Y^l(i, j)$. Namely, the M-ary pyramid can be used to rapidly detect features in the input image without incurring a high computational overhead. The detected features can be used to enhance the motion estimation process as discussed below or other image processing steps, e.g., segmentation of areas (such as objects) within an image, e.g., by using segmentation module 151. Segmentation is an important image processing step, where important areas in the image can be identified to receive special treatment. For example, the face of a person during a video conferencing application may demand special image processing such as receiving a greater allocation of coding bits. Additionally, segmentation can be employed to identify large objects where global motion estimation can be performed on these large objects.

It should be understood that the preceding discussion uses the ternary pyramid as an example and shows one possible method in which the quantization thresholds or levels can be assigned for feature identification and classification. In general, M-ary pyramids with M>2 can be used with the specific assignment of the quantization thresholds being dependent on the requirement of a particular application and/or the content of the image sequence.

Returning to FIG. 2, after the M-ary pyramid is generated, method 200 proceeds to step 220 where the blocks in the frame are classified in terms of low activity or high activity in view of the M-ary pyramid. In the preferred embodiment, the "classification block size" is a 8×8 block having 64 M-ary pixel values represented by 128 bits. An "activity threshold" of 25 is set where the 8×8 block is classified as a high activity block if 25 or more pixel values are nonzero. Otherwise, the 8×8 block is classified as a low activity block. Additional higher block classification can be performed, e.g., classifying a macroblock as either a high activity or low activity macroblock. In the preferred embodiment, a macroblock comprising at least one subblock that is classified as high activity, causes the macroblock to be classified as high activity as well. It should be understood that the "classification block size" and the "activity threshold" can be adjusted according to a particular application and are not limited to those values selected in the preferred embodiment.

Returning to FIG. 2, after block classification, method 200 proceeds to step 230 where the block classifications are used to enhance the motion estimation process. Generally, motion estimates in areas with significant image features are more reliable than motion estimates in relatively "flat areas" with little changes due to the aperture problem (e.g., uniform areas where the content of the image are very similar for adjacent blocks). Therefore, the classification method described above is used to increase the reliability of motion estimates in general. Namely, it should be understood that the present invention can be employed to enhance the performance of various types or different architectures of motion estimation methods.

More specifically, motion estimation is generally performed on a block by block basis in a raster scan order. The computational overhead or cost is generally evenly distributed over all the blocks during the motion estimation process. In the present invention, motion estimation in the "edge" blocks (high activity blocks) can be performed first using a cost function that depends on $Y^l(i, j)$, and/or $X^l(i, j)$. This approach allows the emphasis of the features in the image and provide robust, reliable motion estimates in the presence of sensor noise, quantization noise, and illumination changes. An example of a cost function could involve a bit-wise XOR operation on the M-ary levels in the pyramid, which can be implemented as a fast method on certain architectures. The cost function is used to determine the "best match". Let us consider a M-ary valued block at time t (current frame), $Y^l(i, j, t)$ and another M-ary valued block at time t−1 (previous frame) $Y^l(m,n,t−1)$. The cost function is then expressed as:

$$\sum_{\substack{pixels\ within \\ the\ block}} \text{Number of ones in } \{Y^l(i, j \cdot t) \otimes Y^l(m \cdot n, t - 1)\} \quad (4)$$

where ⊗ represents a bitwise XOR operation. This cost function produces substantial computational savings compared to the standard "absolute difference" cost function used on the original 8-bit pixel intensity values. This procedure is performed hierarchically over the M-ary pyramid.

Figure 5:
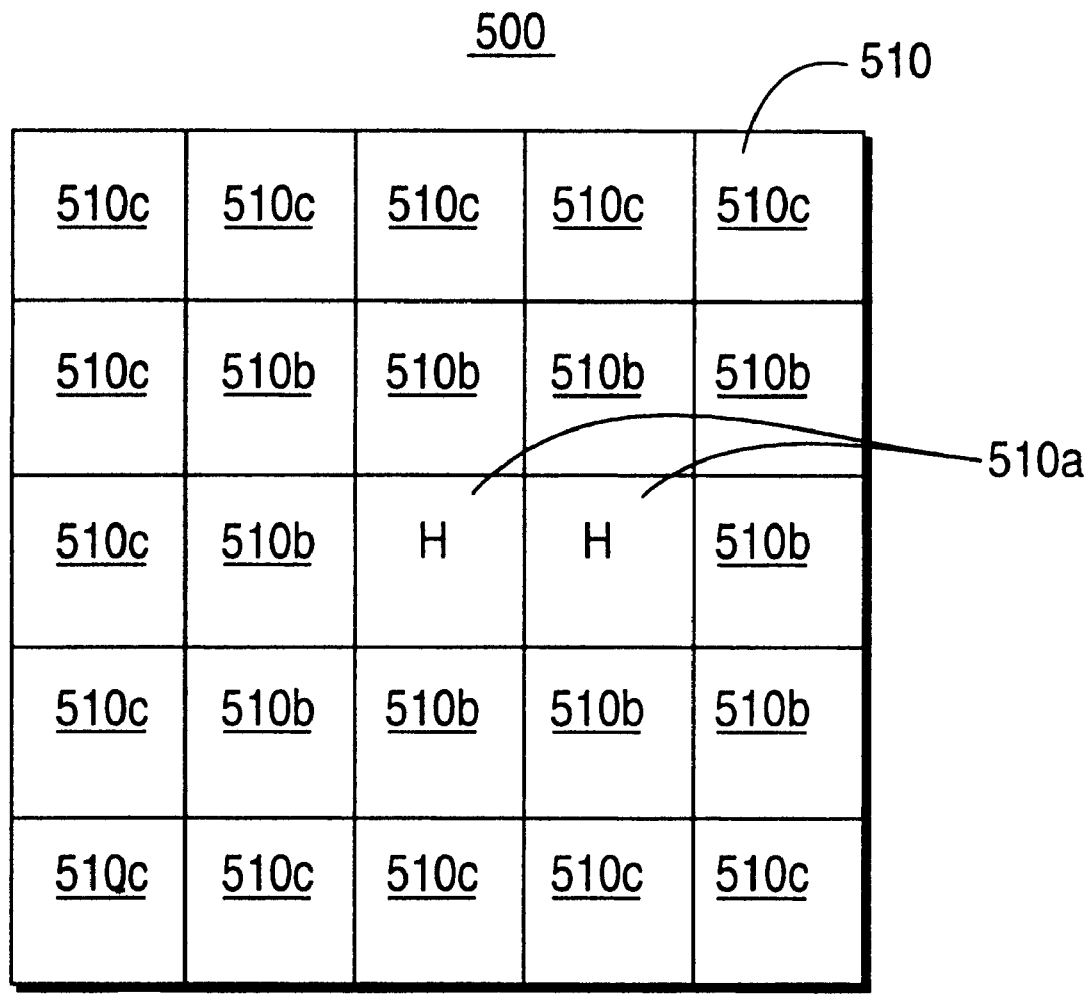
FIG. 5 illustrates an input frame which has been divided and classified into a plurality of blocks.

In other words, the motion estimation method is initiated at the high activity blocks. FIG. 5 illustrates an input frame 500 which has been divided and classified into a plurality of blocks 510. In the preferred embodiment, two blocks 510a have been classified as high activity blocks. As such, motion estimation is performed on these two blocks first. In fact, the computational cost can be increased for these two blocks, since these high activity blocks (high-confidence "edge" blocks), will most likely provide very high accuracy motion vectors. Thus, more intensive motion estimations are performed in these two blocks than other blocks in the image frame 500, e.g., the high activity blocks can be split to obtain more accurate motion vectors, "half pel" motion estimation can be performed in these two blocks or finer search strategies may be employed.

In turn, after motion estimation is completed for the high activity blocks, the motion estimation will then propagate to the low activity blocks ("Low-confidence" blocks) in the image. However, this propagation is done intelligently depending on the region or object segmentation that is obtained from the classification. This propagation is performed by using the motion of the edge blocks as an initialization for the motion of adjacent blocks, and using a relatively small search-range to refine this initialization. Namely, the motion estimation process propagates (e.g., in a spiraling order) to blocks 510*b*, where the initial search area is derived from the motion vectors of the high activity blocks. In turn, this propagation strategy is then extended to "flat" blocks, e.g., blocks 510*c* and so on, that do not lie adjacent to an "edge" block, and has the advantage of fast computation since the refinement search-range is relatively small. Furthermore, the motion estimates will be smoother and easier to encode, which is a major advantage in very low bit rate (VLBR) applications where motion information forms a significant portion of the bit-stream. Furthermore, these smoother motion estimates can be expected to perform better in a temporal interpolation application.

Finally, the classification method also produces computational savings when half-pel refinements are used to increase accuracy of motion estimation. The half-pel refinements are performed only on the "edge" blocks, and not on the relatively flat areas of the image.

Figure 6:
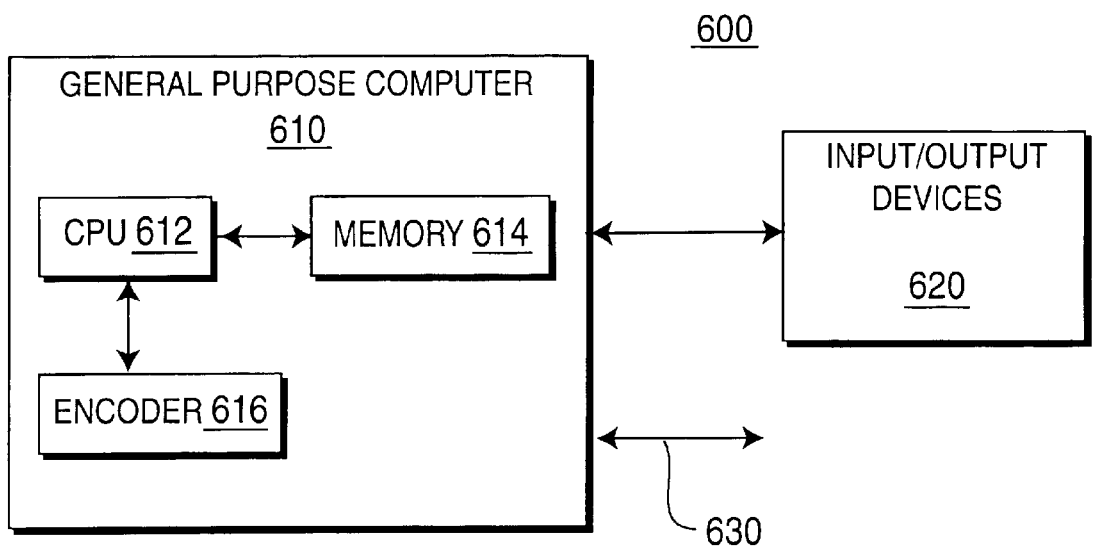
FIG. 6 illustrates an encoding system of the present invention.

FIG. 6 illustrates an encoding system 600 of the present invention. The encoding system comprises a general purpose computer 610 and various input/output devices 620. The general purpose computer comprises a central processing unit (CPU) 612, a memory 614 and an encoder 616 for receiving and encoding a sequence of images.

In the preferred embodiment, the encoder 616 is simply the encoder 100 as discussed above. The encoder 616 can be a physical device which is coupled to the CPU 612 through a communication channel. Alternatively, the encoder 616 can be represented by a software application which is loaded from a storage device, e.g., a magnetic or optical disk, and resides in the memory 612 of the computer. As such, the encoder 100 of the present invention can be stored on a computer readable medium.

The computer 610 can be coupled to a plurality of input and output devices 620, such as a keyboard, a mouse, a camera, a camcorder, a video monitor, any number of imaging devices or storage devices, including but not limited to, a tape drive, a floppy drive, a hard disk drive or a compact disk drive. The input devices serve to provide inputs to the computer for producing the encoded video bitstreams or to receive the sequence of video images from a storage device or an imaging device. Finally, a communication channel 630 is shown where the encoded signal from the encoding system is forwarded to a decoding system (not shown).

Although various embodiments which incorporate the teachings of the present invention have been shown and described in detail herein, those skilled in the art can readily devise many other varied embodiments that still incorporate these teachings.

What is claimed is:

1. A method for classifying activity within an image, where said image is divided into a plurality of blocks, said method comprising the steps of:

(a) decomposing the image into a first image pyramid;

(b) generating a second image pyramid from said first image pyramid, wherein said second image pyramid is a M-ary pyramid; and (c) classifying the activity within the blocks of the image using said M-ary pyramid.

2. The method of claim 1, wherein said M-ary pyramid has a M value greater than 2.

3. The method of claim 2, wherein said first image pyramid is a mean pyramid.

4. The method of claim 3, wherein said M-ary pyramid is generated by quantizing a plurality of differences between children and parent pixels of said mean pyramid.

5. The method of claim 4, wherein said M-ary pyramid is a ternary pyramid.

6. The method of claim 5, wherein said ternary pyramid is formed in accordance with:

$$Y^l(i,j) = \text{Quant}[X^l(i,j) - X^{l+1}(\text{INT}(i/2), \text{INT}(j/2))], 0 \leq l \leq L-1 \text{ and}$$

$$Y^l(i,j) = \text{Quant}\left[X^l(i,j) - X^{l+1}\left(\text{INT}\left(\frac{i}{2}\right), \text{INT}\left(\frac{j}{2}\right)\right)\right], 0 \leq l \leq L-1$$

and $$Y^l(i,j) = \begin{cases} 00 & |\lambda| < T \\ 01 & \lambda > T \\ 10 & \lambda < -T \end{cases}$$

where an argument of Quant[·] is denoted by λ, T is a threshold, and $Y^l(i, j)$ is a value at a location (i,j).

7. The method of claim 2, further comprising the step of:

(d) estimating motion vectors in accordance with said classification of the blocks of the image.

8. The method of claim 7, wherein said motion vectors are estimated first for blocks that are classified as high activity blocks.

9. The method of claim 8, wherein said motion vectors are estimated next for blocks that are classified as low activity blocks and are immediately adjacent to said high activity blocks, where a search area for each of said next low activity blocks is derived from one or more motion vectors of said adjacent high activity blocks.

10. The method of claim 9, wherein motion vectors for remaining blocks in the image are estimated in a spiraling order.

11. The method of claim 8, wherein said motion vectors of said high activity blocks are computed using a more intensive motion estimation method than blocks that are classified as low activity.

12. The method of claim 2, further comprising the step of:

(d) segmenting an area within the image in accordance with said classification of the blocks of the image.

13. The method of claim 12, wherein said segmented area represents an object within the image.

14. Apparatus for classifying activity within an image, where said image is divided into a plurality of blocks, said apparatus comprising:

a pyramid generator for decomposing the image into a first image pyramid and for generating a second image pyramid from said first image pyramid, wherein said second image pyramid is a M-ary pyramid; and a block classifier, coupled to said pyramid generator, for classifying the activity within the blocks of the image using said M-ary pyramid.

15. The apparatus of claim 14, wherein said M-ary pyramid has a M value greater than 2.

16. The apparatus of claim 15, wherein said first image pyramid is a mean pyramid.

17. The apparatus of claim 16, wherein said M-ary pyramid is a ternary pyramid.

18. The apparatus of claim 15, further comprising:

a motion estimation module, coupled to said block classifier, for estimating vectors in accordance with said classification of the blocks of the image.

19. The apparatus of claim 18, wherein said motion vectors are estimated first for blocks that are classified as high activity blocks.

20. The apparatus of claim 15, further comprising:

a segmentation module, coupled to said block classifier, for segmenting an area within the image in accordance with said classification of the blocks of the image.

21. A computer-readable medium having stored thereon a plurality of instructions, the plurality of instructions including instructions which, when executed by a processor, cause the processor to perform the steps comprising of:

(a) decomposing an image into a first image pyramid;

(b) generating a second image pyramid from said first image pyramid, wherein said second image pyramid is a M-ary pyramid; and (c) classifying the activity within the blocks of the image using said M-ary pyramid.

22. The computer-readable medium of claim 21, wherein said first image pyramid is a mean pyramid.

23. The computer-readable medium of claim 22, wherein said M-ary pyramid is generated by quantizing a plurality of differences between children and parent pixels of said mean pyramid.

24. The computer-readable medium of claim 21, further comprising the step of:

(d) estimating motion vectors in accordance with said classification of the blocks of the image.

25. The computer-readable medium of claim 21, further comprising the step of:

(d) segmenting an area within the image in accordance with said classification of the blocks of the image.

* * * * *

UNITED STATES PATENT AND TRADEMARK OFFICE
CERTIFICATE OF CORRECTION

PATENT NO. : 6,408,101 B1
DATED : June 18, 2002
INVENTOR(S) : Ravi Kirshnamurthy et al.

It is certified that error appears in the above-identified patent and that said Letters Patent is hereby corrected as shown below:

<u>Title page,</u>
Item [75], Inventors, please change "Zudong" to -- Xudong --.

<u>Column 2,</u>
Line 6, please change "examples" to -- example --.
Line 24, please change "A such" to -- As such --.

<u>Column 3,</u>
Line 10, please change "compliant" to -- compliance --.

<u>Column 6,</u>
Line 66, please change "a block can" to -- a block can be --.

<u>Column 8,</u>
Line 47, please change "$(i, j \cdot t) \otimes Y^1 (m \cdot n, t - 1)$" to -- $(i, j, t) \otimes Y1(m, n, t\text{-}1)$ --.

Signed and Sealed this

Twenty-sixth Day of November, 2002

Attest:

JAMES E. ROGAN
Attesting Officer
Director of the United States Patent and Trademark Office